United States Patent
Katsuda

(10) Patent No.: US 11,184,492 B2
(45) Date of Patent: Nov. 23, 2021

(54) IMAGE FORMING APPARATUS AND VOICE INPUT CONTROL

(71) Applicant: KONICA MINOLTA, INC., Tokyo (JP)

(72) Inventor: Takeo Katsuda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/858,794

(22) Filed: Apr. 27, 2020

(65) Prior Publication Data
US 2020/0396348 A1     Dec. 17, 2020

(30) Foreign Application Priority Data
Jun. 11, 2019  (JP) .............................. JP2019-108842

(51) Int. Cl.
*G06F 15/00* (2006.01)
*H04N 1/00* (2006.01)

(52) U.S. Cl.
CPC ..... *H04N 1/00403* (2013.01); *H04N 1/00488* (2013.01); *H04N 1/00891* (2013.01)

(58) Field of Classification Search
CPC ........... H04N 1/00403; H04N 1/00488; H04N 1/00891
USPC ........................................................ 358/442
See application file for complete search history.

(56) References Cited

U.S. PATENT DOCUMENTS

| | | | | |
|---|---|---|---|---|
| 2006/0143011 | A1* | 6/2006 | Kawamura | G09B 21/006 704/260 |
| 2013/0117591 | A1* | 5/2013 | Enomoto | G06F 1/3231 713/320 |

FOREIGN PATENT DOCUMENTS

JP       2014075722 A      4/2014

* cited by examiner

*Primary Examiner* — Mark R Milia
(74) *Attorney, Agent, or Firm* — Holtz, Holtz & Volek PC

(57) ABSTRACT

An apparatus includes: an operation panel that displays an operation screen and accepts an operation from a user; a hardware processor that accepts an operation from a user by voice, turns off the operation panel in a case where an interval between operations received by the operation panel exceeds a first set time, and resets a setting content stored in the storage in a case where an interval between operations received by the operation panel or the hardware processor exceeds a second set time; a storage that stores a setting content corresponding to an operation received by the operation panel or the hardware processor; and a changer that changes a set time of a timer.

7 Claims, 11 Drawing Sheets

IMAGE FORMING APPARATUS AND VOICE INPUT CONTROL

The entire disclosure of Japanese patent Application No. 2019-108842, filed on Jun. 11, 2019, is incorporated herein by reference in its entirety.

BACKGROUND

Technological Field

The present invention relates to an apparatus capable of accepting an operation from a user through an operation panel and voice.

Description of the Related Art

In various apparatuses, an operation from a user is accepted through an operation panel that displays an operation screen. Additionally, an apparatus such as a multifunction peripheral that receives a complicated setting operation is provided with a setting reset timer function that, if a state in which the next operation is not received continues for a certain period of time or more during a period of accepting an operation, determines that the operation has been interrupted, and automatically resets the setting contents received so far. Additionally, in many apparatuses, power is saved by an off-timer function that turns off the display of an operation screen in a case where a state in which no operation is received continues for a certain period of time or more.

For example, JP 2014-075722 A discloses an apparatus having an active power saving mode in which a display is turned off while an operation of an application is continued.

Additionally, in recent years, the performance of voice recognition has been improved, and some apparatuses can accept both input from an operation panel and input by voice operation. For example, JP 2014-117850 A discloses an apparatus that turns on a display device and displays the result of voice recognition when a voice operation is received while the display device is turned off in a power saving mode.

In voice operation, the operation interval between one voice operation and the next voice operation is often longer than the operation interval in a case where manual input is performed on an operation panel. For example, if another person speaks to an operator who is performing a voice operation, the operator will answer by voice, and the next voice operation will be given after the answer. On the other hand, the input operation on the operation panel can be continued while replying to the other party. Additionally, in the case of voice operation, the operator can perform another task such as manually setting a document on a scanner or setting paper on a paper feed tray concurrently with the voice operation. For this reason, noise generated in another task may hinder voice recognition and the voice operation may take time.

Thus, in voice operation, the operation interval is often longer than that during input from the operation panel. Hence, if the setting reset timer function is applied with the set time set to the same length as when receiving operation from the operation panel, the setting reset timer function may inadvertently reset the setting contents up to that time, in the middle of the voice operation.

As a countermeasure, it is conceivable that the set time of the setting reset timer function while accepting a voice operation is made longer than while receiving an operation from the operation panel. However, in a case where the setting reset timer function and the above-mentioned off-timer function are used together, the set time of the setting reset timer function is usually the same as or shorter than the set time of the off-timer function. Hence, if the set time of the setting reset timer function is elongated in accordance with the voice operation, the set time of the off-timer function is also elongated. This keeps the operation panel on for a needlessly long time during the voice operation, and reduces the power saving effect. A similar problem occurs in a case where there is another power-saving timer for a module other than the operation panel.

SUMMARY

The present invention has been made in view of the above-described problems, and aims to provide an apparatus that saves power and does not inadvertently activate a setting reset timer function and reset setting contents during voice operation.

To achieve the abovementioned object, according to an aspect of the present invention, an apparatus reflecting one aspect of the present invention comprises: an operation panel that displays an operation screen and accepts an operation from a user; a hardware processor that accepts an operation from a user by voice, turns off the operation panel in a case where an interval between operations received by the operation panel exceeds a first set time, and resets a setting content stored in the storage in a case where an interval between operations received by the operation panel or the hardware processor exceeds a second set time; a storage that stores a setting content corresponding to an operation received by the operation panel or the hardware processor; and a changer that changes a set time of a timer, wherein the changer sets the second set time longer than the first set time during acceptance of a setting by voice operation, and sets the second set time to a same or shorter time than the first set time during acceptance of a setting by operation on the operation panel.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
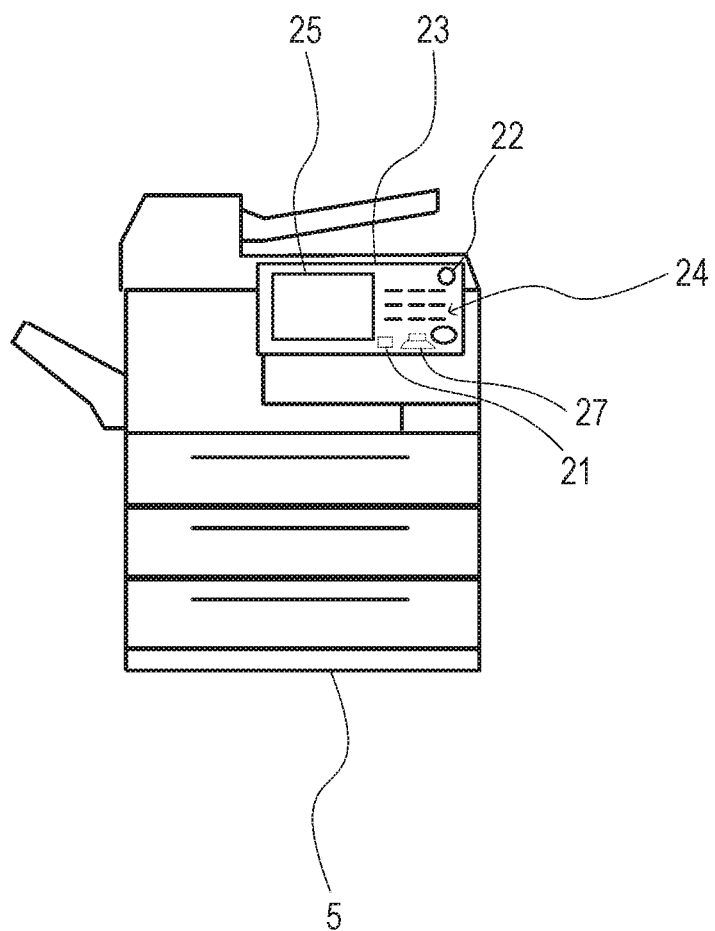
FIG. 1 is a diagram showing an external view of an apparatus (multifunction peripheral) according to an embodiment of the present invention.

FIG. 1 shows an external view of a multifunction peripheral that is an example of an apparatus 5 according to an embodiment of the present invention. The apparatus 5 may be any apparatus as long as it has a function of accepting an operation from a user. Here, the apparatus 5 is a so-called multifunction peripheral (MFP) having functions such as a copy function of optically reading a document and printing a duplicate image thereof on a recording paper, a scan function of saving image data of the read document as a file or sending it to an external terminal through a network, a printer function of printing and outputting an image of print data received from a personal computer (PC) or the like through a network onto a recording paper, and a facsimile function of transmitting and receiving image data according to a facsimile procedure.

The apparatus 5 accepts various setting operations from a user or an administrator by a pressing operation on a hard switch or a touch operation on a soft switch on an operation screen displayed on a display 25 of an operation panel 23. Additionally, the apparatus 5 has a voice operation function of accepting various inquiries, requests, instructions, settings, and the like by voice. The setting contents or the like of the job set by the voice operation are displayed on the operation screen of the operation panel 23. If the display of the operation panel 23 is not turned off, the user can confirm the setting contents set by the voice operation on the operation screen.

The apparatus 5 has a setting reset timer function of determining that a series of operations has been interrupted halfway and automatically resetting the setting contents corresponding to the operations received so far, in a case where the interval between operations received from the user exceeds a certain period of time. Additionally, to save power, the apparatus 5 has a panel-off timer function of turning off the display of the operation screen in a case where the interval between operations received on the operation panel exceeds a certain period of time (in a case where unoperated state of operation panel continues for more than certain period of time).

Figure 2:
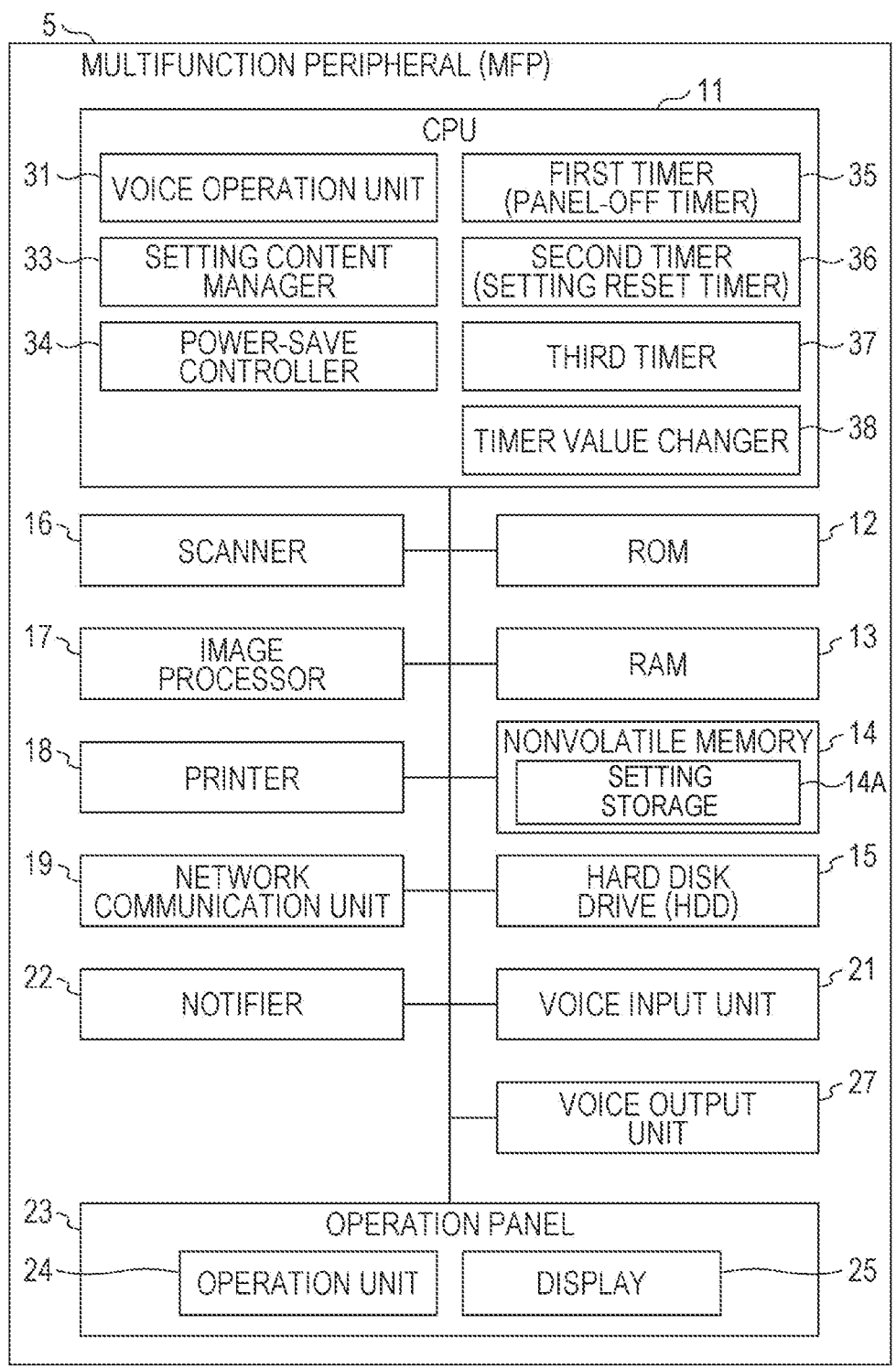
FIG. 2 is a block diagram showing a schematic configuration of the apparatus (multifunction peripheral) according to the embodiment of the present invention.

FIG. 2 is a block diagram showing a schematic configuration of the apparatus 5. The apparatus 5 has a central processing unit (CPU) 11 as a controller that has centralized control over the operation of the apparatus 5, The CPU 11 is connected, through a bus, to a read only memory (ROM) 12, a random access memory (RAM) 13, a nonvolatile memory 14, a hard disk drive 15, a scanner 16, an image processor 17, a printer 18, a network communication unit 19, a voice input unit 21, a voice output unit 27, a notifier 22, the operation panel 23, and the like.

The CPU 11 is based on an operating system (OS) program, and runs middleware, application programs, and the like on the OS. Various programs are stored in the ROM 12, and various functions of the apparatus 5 are implemented by the CPU 11 executing various types of processing according to these programs.

The RAM 13 is used as a work memory for temporarily storing various data when the CPU 11 executes processing on the basis of a program, and as an image memory for storing image data, for example.

The nonvolatile memory 14 is a memory (flash memory) whose stored contents are not destroyed even when the power is turned off, and is used for storing default set values, administrator settings, and the like. Additionally, the nonvolatile memory 14 plays a role of a setting storage 14a that stores setting contents being set while receiving a series of setting operations for inputting a job and the like from a user.

The hard disk drive 15 is a large-capacity nonvolatile storage device, and stores various programs and data in addition to print data and screen data of the operation screen and the setting screen.

The scanner 16 has a function of optically reading a document and acquiring image data. The scanner 16 has an automatic document feeder (ADF) for sequentially feeding out and reading multiple documents set on a scanner bed. Additionally, the ADF can read the front and back of a document by flipping the front and back of the document.

The image processor 17 performs processing such as image enlargement/reduction and rotation, as well as rasterization for converting print data into image data, and compression/decompression of image data.

The printer 18 has a function of forming an image corresponding to the image data on a recording paper. Here, the printer 18 is formed as an engine unit of a so-called laser printer that has a recording paper transport device, a photosensitive drum, a charging device, a laser unit, a developing device, a transfer separation device, a cleaning device, and a fixing device, and forms an image by an electrophotographic process. Other image forming schemes may be adopted.

The network communication unit 19 has a function of communicating with various external devices and servers through a network such as a LAN.

The operation panel 23 includes an operation unit 24 and a display 25. Various operation screens and setting screens are displayed on the display 25. The display 25 includes a liquid crystal display, its driver, and other components. The operation unit 24 receives various operations (touch operation and pressing operation) from the user. The operation unit 24 includes various hard switches such as a start button and numeric keys, and a touch panel provided on a display surface of the display 25. The operation panel 23 generates an operation command corresponding to the operation content received from the user, and outputs it to the CPU 11 (setting content manager 33 described later).

The voice input unit 21 includes a microphone, a circuit that converts an analog audio signal output from the microphone into a digital signal, and other components. The voice input unit 21 detects voice uttered by the user and converts the voice into an electric signal.

The voice output unit 27 includes a speaker, an amplifier for driving the speaker, and other components. The voice output unit 27 converts an audio signal input from the CPU 11 into a sound and outputs the sound.

The notifier 22 has a function of notifying the user that a setting is being accepted by voice operation when a setting is being accepted by voice operation while the operation panel 20 is turned off. Here, the notifier 22 is a light-emitting body such as an LED or a lamp.

In addition to controlling the overall operation of the apparatus 5, the CPU 11 functions as a voice operation device 31, the setting content manager 33, a power-save controller 34, a panel-off timer 35, a setting reset timer 36, a third timer 37, a timer value changer 38, and the like.

The voice operation device 31 has a function of analyzing an audio signal from the voice input unit 21 to recognize the input voice operation, generating an operation command corresponding to the voice operation, and outputting the operation command to the setting content manager 33. The setting content manager 33 stores a setting content corresponding to an operation command in the setting storage 14a, according to the operation command received from the voice operation device 31 or the operation panel 23. While receiving a series of operations related to job input and the like, the setting storage 14a sequentially stores setting contents corresponding to the received operations.

The power-save controller 34 performs tasks such as turning on/off the power of each unit, switching to a power saving mode, and returning to a normal power mode from the power saving mode. The power-save controller 34 performs tasks such as turning on/off the operation panel 23 (particularly, display 25), turning on/off the printer 18 and the scanner 16 or switching them to the power saving mode, and switching the operation mode of the CPU 11 (normal power mode/power saving mode).

The panel-off timer 35 has a function of turning off the operation panel 23 in a case where the interval between operations received on the operation panel 23 exceeds a first set time. Specifically, the panel-off timer 35 includes a timer for measuring time, resets the measured time of the timer every time an operation is received on the operation panel 23, and outputs an instruction to turn off the operation panel 23 to the power-save controller 34 when the measured time reaches a predetermined set value (first set time). The set value (first set time) for the panel-off timer 35 is defined as an off-timer value.

The setting reset timer 36 has a function of resetting the setting contents stored in the setting storage 14a in a case where the interval between operations received on the operation panel 23 or the voice operation device 31 exceeds a second set time. Specifically, the setting reset timer 36 includes a timer for measuring time, and has a function of resetting the measured time of the timer every time an operation is received on the operation panel 23 or every time a voice operation is received, and outputting, to the setting content manager 33, an instruction to reset the currently accepted setting contents stored in the setting storage 14a when the measured time reaches a predetermined set value (second set time). The set value (second set time) for the setting reset timer 36 is defined as a reset timer value.

The third timer 37 is a timer for determining a timing at which to shift a predetermined module other than the operation panel 23 (e.g., scanner 16 or printer 18 (particularly, fixing device or the like)) to the power saving mode or to turn the module off. For example, the third timer 37 has a function of measuring the elapsed time from the end of printing, and outputting, to the power-save controller 34, an instruction to shift the printer 18 to the power saving mode in a case where a state with no subsequent print job continues for a certain period of time or more.

The timer value changer 38 has a function of changing the set values of the panel-off timer 35, the setting reset timer 36, and the third timer 37. In a normal default state (including during acceptance of setting by operation on operation panel 23), the timer value changer 38 sets the off-timer value set in the panel-off timer 35 to a set value A, and the reset timer value set in the setting reset timer 36 to a set value B. The set value A and the set value B are in a magnitude relationship of set value A≥set value B.

During acceptance of a setting by voice operation, the off-timer value set in the panel-off timer 35 is set to a set value C, and the reset timer value set in the setting reset timer 36 is changed to a set value D. The set value C and the set value D are in a magnitude relationship of set value D>set value C.

In the above, set value A=set value C may be set. It is preferable that set value C<set value A set value D>set value B.

Note that "during acceptance of a setting" refers to a period from when a first operation (operation on operation panel 23 or voice operation) related to a series of settings for job input and the like is received until the series of settings is completed (e.g., until start operation is received after job input is completed), or until the series of settings is cancelled halfway.

In the apparatus 5, when the operation interval exceeds a time corresponding to the set value A of the reset timer value during acceptance of a setting from the operation panel 23, the setting reset timer 36 times out, and the setting contents up to that time are reset. Thereafter, when the no operation state continues and a time corresponding to the set value B of the off-timer value elapses after receiving the previous operation, the panel-off timer 35 times out and the power of the operation panel 23 is turned off to enter a power-saving state.

On the other hand, during acceptance of a setting by voice operation, the set value C is set in the panel-off timer 35 and the set value D is set in the setting reset timer 36. Hence, when the state where there is no operation on the operation panel 23 exceeds a time corresponding to the set value C of the off-timer value, the panel-off timer 35 times out and the power of the operation panel 23 is turned off.

The voice operation can be continued with the operation panel 23 turned off. In voice operation, the operation interval may become longer than that during an input operation from the operation panel 23 in some cases. However, if the set value D is set longer than the set value B, even if the operation interval becomes longer to some extent in the middle of the voice operation (e.g., even if set value B<no operation time<set value D), the setting contents are not reset, and the voice operation can be continued. When the no operation time of voice operation becomes longer than the set value D, the setting reset timer 36 times out (determining that voice operation has been stopped halfway), and the setting contents up to that time are automatically reset.

As described above, during acceptance of a setting by voice operation, the reset timer value is set longer than during acceptance of a setting by operation from the operation panel. Hence, it is possible to prevent the setting contents from being inadvertently reset in the middle of the voice operation. Additionally, even during acceptance of a setting by voice operation, the off-timer value is set to the same or shorter time than that during acceptance of a setting by operation from the operation panel. Hence, it is possible to prevent the unused operation panel 23 from being kept on for a long time and needlessly consuming power.

Figure 3:
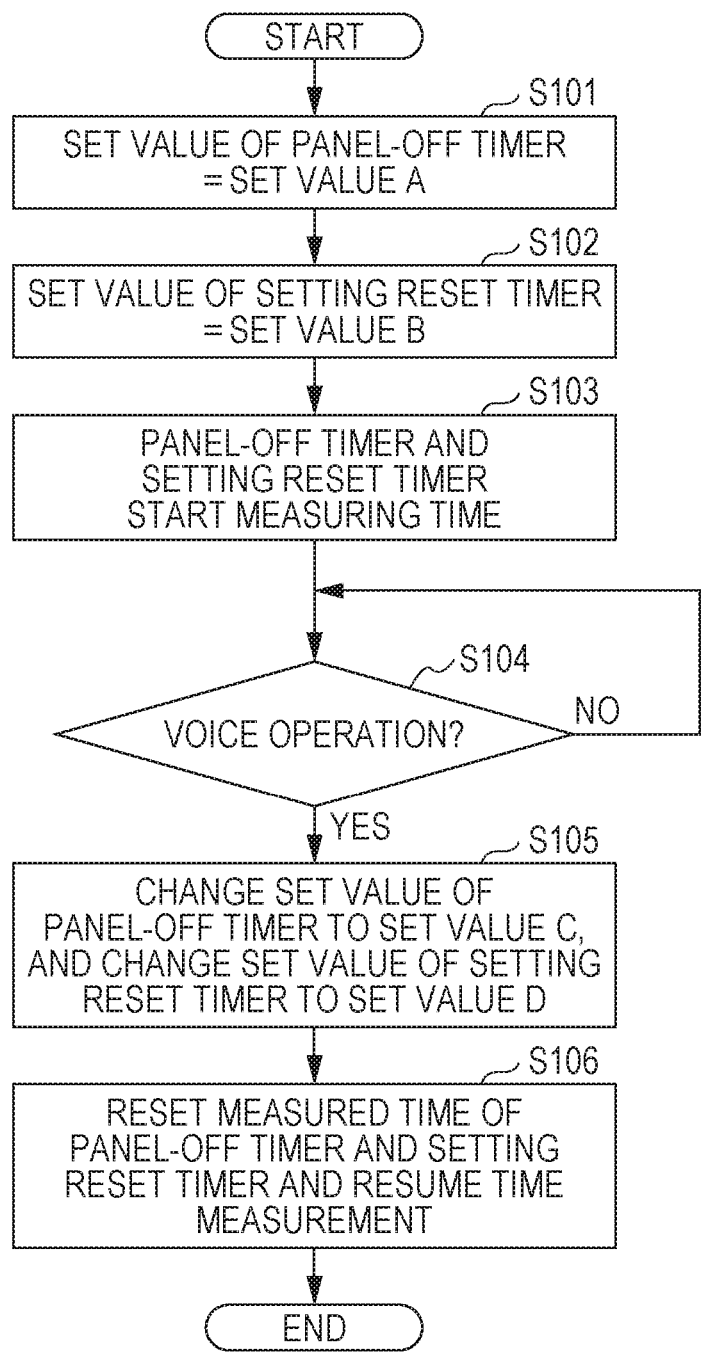
FIG. 3 is a flowchart showing an example of processing performed by a timer value changer.

FIG. 3 is a flowchart showing an example of processing performed by the timer value changer 38. First, the off-timer value is set to a default set value A (step S101), and the reset timer value is set to a default set value B (step S102). As described above, the set values A and B are in a magnitude relationship of set value A>set value B. Thereafter, the panel-off timer 35 and the setting reset timer 36 start measuring time (step S103).

Next, it is monitored whether or not a voice operation is received (step S104; No). If a voice operation is received (step S104; Yes), the off-timer value set in the panel-off timer 35 is changed to the set value C, and the reset timer value set in the setting reset timer 36 is changed to the set value D (step S105). As described above, the set values C and D are in a magnitude relationship of set value D>set value C. Additionally, there is a relationship of set value D>set value B. Note that the off-timer value may be set value A=set value C or set value C<set value A. After the change in the timer values, the panel-off timer 35 and the setting reset timer 36 resume time measurement (step S106).

Note that it is also possible to perform an operation from the operation panel 23 while a setting is being accepted by voice operation and before the operation panel 23 is turned off. When a setting operation is received from the operation panel 23 during acceptance of a setting by voice operation, the timer value changer 38 changes the off-timer value to the set value A and the reset timer value to the set value B to restore the timer values to their default values. Additionally, in a case where the setting reset timer 36 resets the setting contents during voice operation, too, the timer value changer 38 changes the off-timer value to the set value A and the reset timer value to the set value B to restore the timer values to their default values.

Figure 4:
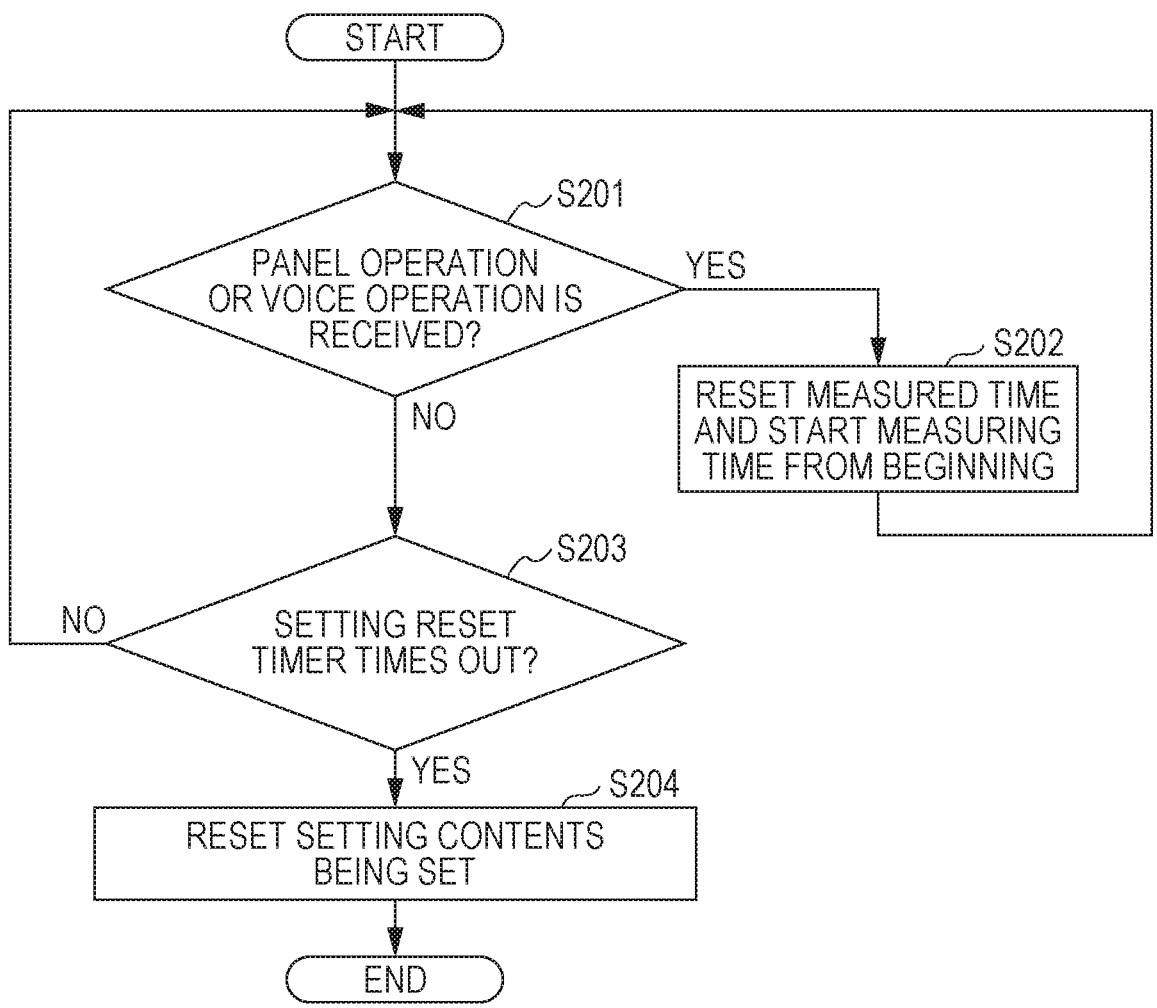
FIG. 4 is a flowchart showing an operation of a setting reset timer.

FIG. 4 is a flowchart showing an operation of the setting reset timer 36 after the start of time measurement. The setting reset timer 36 measures time continuously, and if any voice operation or operation from the operation panel 23 is received while measuring time (step S201; Yes), the setting reset timer 36 resets the measured time to start measuring time from the beginning (step S202), and the processing returns to step S201.

If neither the voice operation nor the operation from the operation panel 23 is received (step S201; No), it is determined whether or not the measured time reaches the reset timer value (step S203). If the measured time of the setting reset timer 36 does not reach the reset timer value (step S203; No), the processing returns to step S201 and the time measurement is continued. If the measured time of the setting reset timer 36 reaches the set reset timer value (step S203; Yes), the setting content manager 33 is notified accordingly, the currently set setting contents stored in the setting storage 14a are reset (step S204), and the processing is ended.

Figure 5:
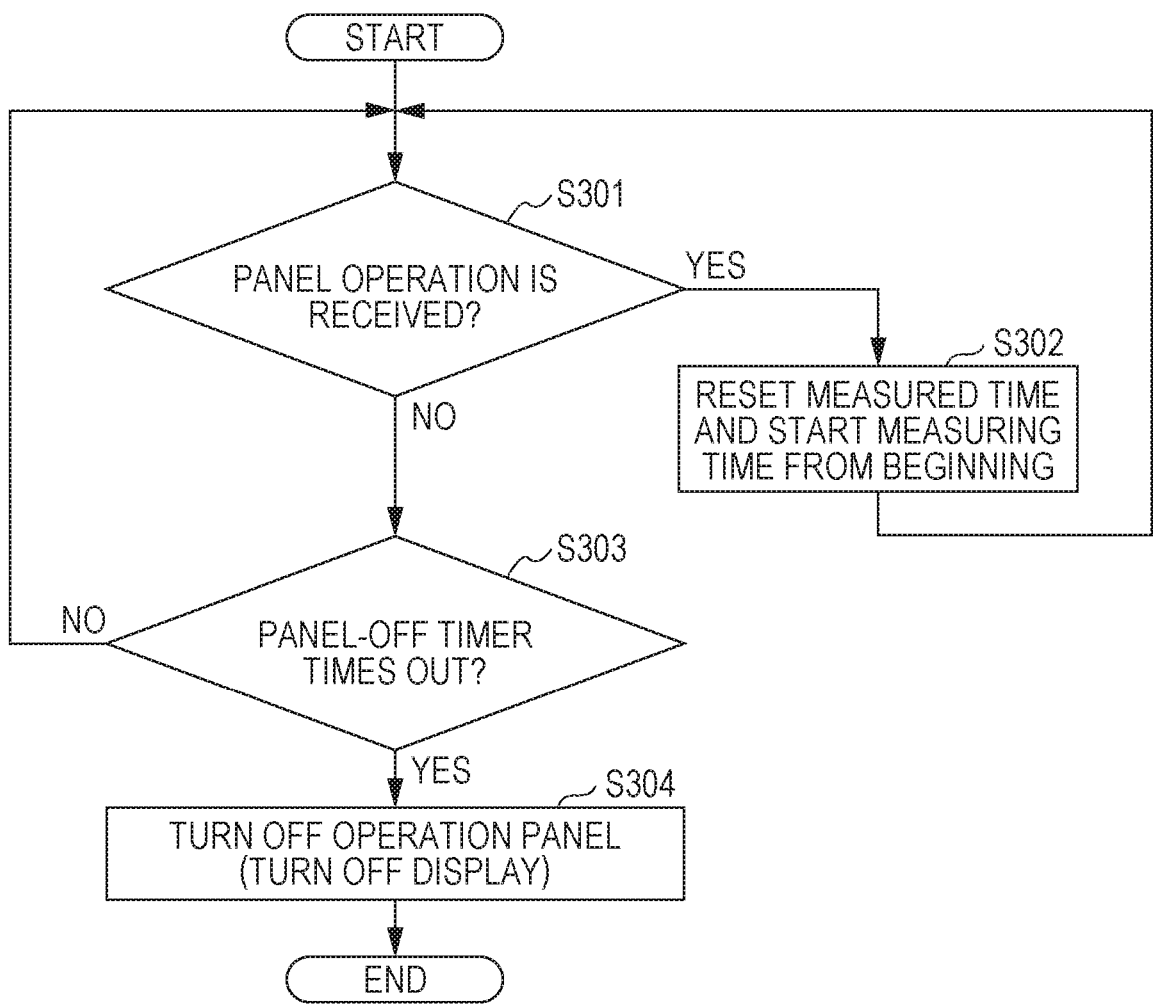
FIG. 5 is a flowchart showing an operation of a panel-off timer.

FIG. 5 is a flowchart showing an operation of the panel-off timer 35 after the start of time measurement. The panel-off timer 35 measures time continuously, and when receiving any operation from the operation panel 23 (step S301; Yes), resets the measured time, starts measuring from the beginning (step S302), and returns to step S301.

If no operation is received from the operation panel 23 (step S301; No), it is determined whether or not the measured time reaches the off-timer value (step S303). If the measured time of the panel-off timer 35 does not reach the off-timer value (step S303; No), the processing returns to step S301 and the time measurement is continued. When the measured time of the panel-off timer 35 reaches the set off-timer value (step S303; Yes), the power-save controller 34 is notified accordingly, the power of the operation panel 23 is turned off (step S304), and the processing is ended.

During acceptance of a setting by voice operation,
Reset timer value>Off-timer value Hence, even after the power of the operation panel 23 is turned off, the acceptance of the setting by voice operation is continued. However, when the operation panel 23 is turned off, it becomes difficult for the user to determine whether or not a setting is currently being accepted by voice operation. For this reason, in a case where the no operation period becomes long in the middle of the voice operation and the setting contents are reset by the setting reset timer 36, the user may erroneously continue the voice operation without noticing the situation.

Hence, in the apparatus 5 according to the embodiment, after the operation panel 23 is turned off during acceptance of a setting by voice operation, the notifier 22 that operates even when the operation panel 23 is turned off is used to notify the user that a setting is being accepted by voice operation. For example, the notification is made by blinking an LED of the notifier 22.

Figure 6A:
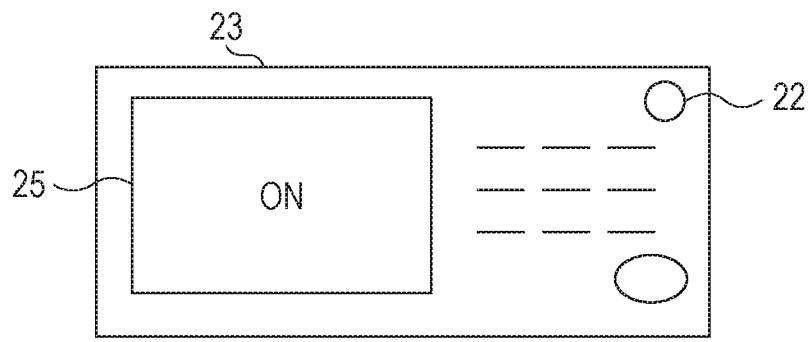
FIGS. 6A to 6C are diagrams showing various lit states of a notifier indicating that a setting is being accepted by voice operation when an operation panel is turned off.
Figure 6B:
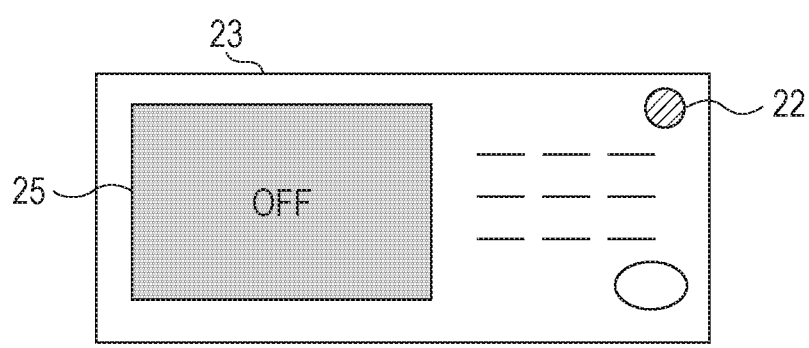
Figure 6C:
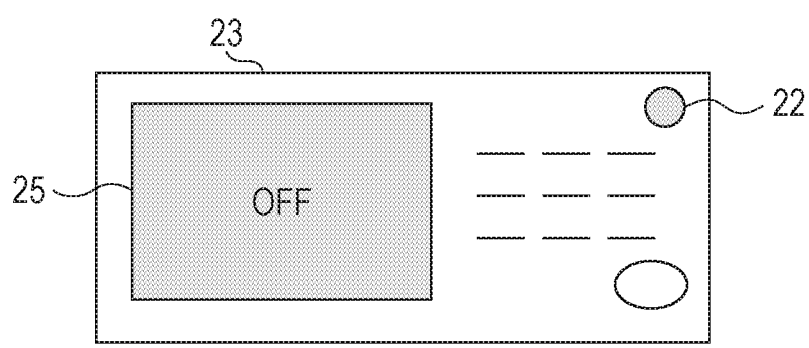

In examples of FIGS. 6A to 6C, if the operation panel 23 is turned on and the apparatus 5 is in a normally operable state, the notifier 22 is lit in blue (FIG. 6A), whereas if an anomaly occurs and use of the apparatus 5 is disallowed, for example, the notifier 22 is lit in red.

While the operation panel 23 is turned off and a setting is being accepted by voice operation, the lighting color of the notifier 22 is changed to a color different from the above, such as yellow, or the notifier 22 is blinked (FIG. 6B). In a case where the operation panel 23 is turned off and no setting is being accepted by voice operation (e.g., in a case where setting contents are reset or entire apparatus 5 is in power saving mode (in sleep mode), the notifier 22 is turned off (FIG. 6C).

Figure 7:
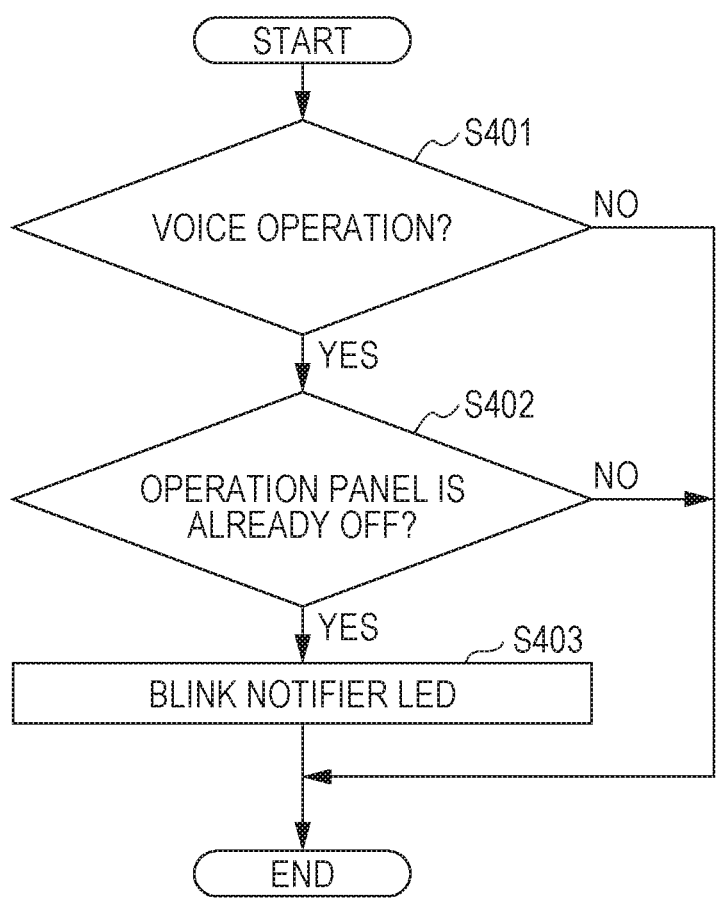
FIG. 7 is a flowchart showing an example of processing according to lighting control of the notifier.

FIG. 7 is a flowchart showing an example of processing according to lighting control of the notifier 22. In the processing, when a setting is being accepted by voice operation (step S401; Yes) and the operation panel 23 is turned off (step S402; Yes), the notifier 22 is blinked (step S403).

Note that the method of notifying the user of whether or not a setting is being accepted by voice operation when the operation panel 23 is turned off is not limited to the display by the notifier 22, and the notification may be made by voice from the voice output unit 27, for example. Additionally, in a case where outputting a voice response or guidance by voice from the voice output unit 27 in response to a voice operation from the user, the above-described notification may be made by changing the type of voice (male voice, female voice, or the like) depending on whether voice operation is being accepted or not.

Second Embodiment

Next, a case in which external devices perform input and analysis of voice will be described.

Figure 8:
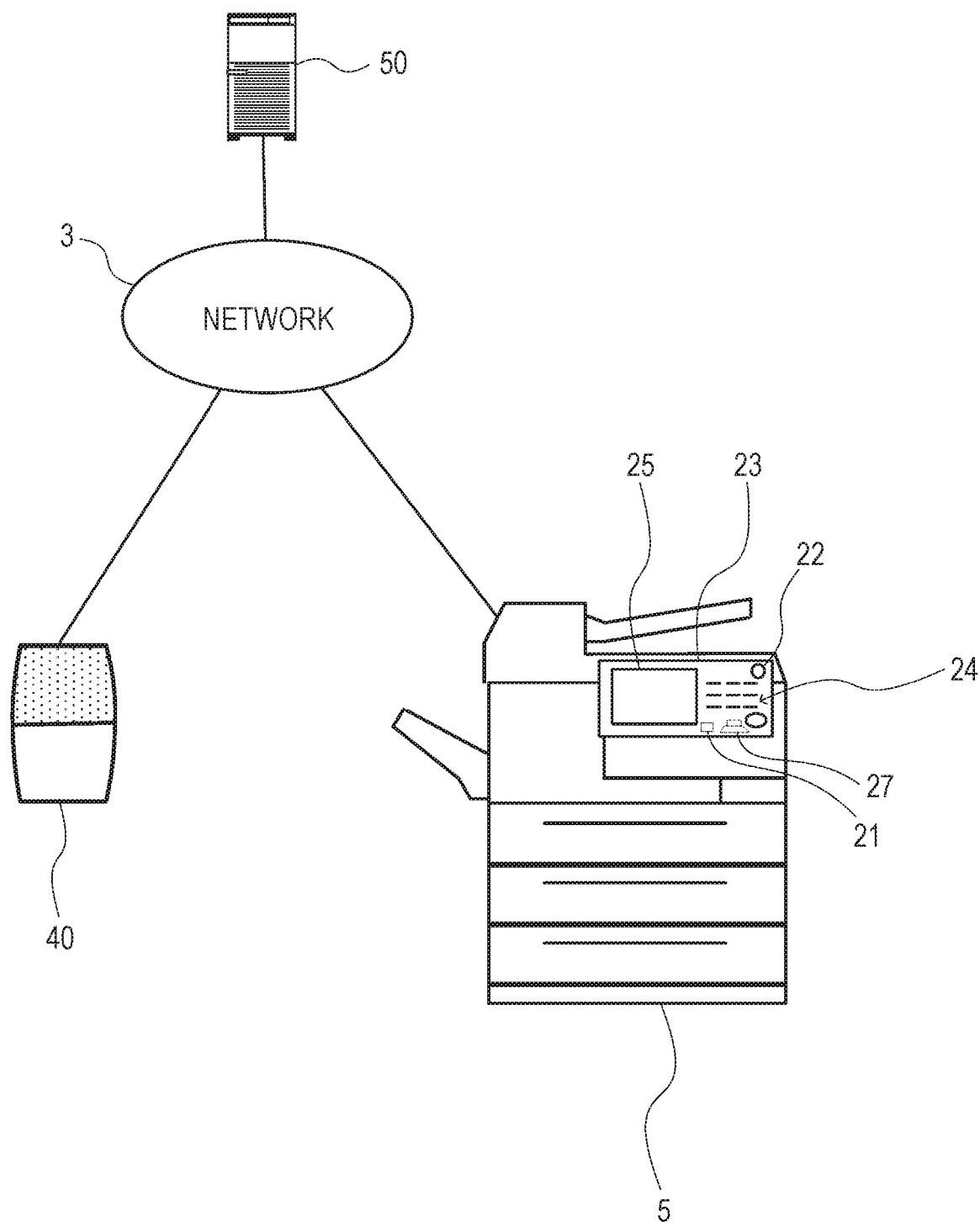
FIG. 8 is a diagram showing a configuration example of a system according to a second embodiment of the present invention.

FIG. 8 shows a configuration example of a system in which a voice input/output terminal 40 and a voice recognition server 50 are connected to an apparatus 5 through a network 3.

The voice input/output terminal 40 includes a microphone that converts voice uttered by the user into an electric signal, a speaker that outputs sound (physical vibration) corresponding to voice data, a voice input/output circuit, a communication unit for communicating with the voice recognition server 50, and other components. The voice input/output terminal 40 has a function of transmitting data corresponding to an audio signal output from the microphone to the voice recognition server 50, and a function of outputting sound corresponding to voice data received from the voice recognition server 50 from the speaker.

The voice recognition server 50 has a function of analyzing the audio signal received from the voice input/output terminal 40, recognizing the content of the voice operation, generating an operation command corresponding to the voice operation, and transmitting the operation command to the apparatus 5.

Figure 9:
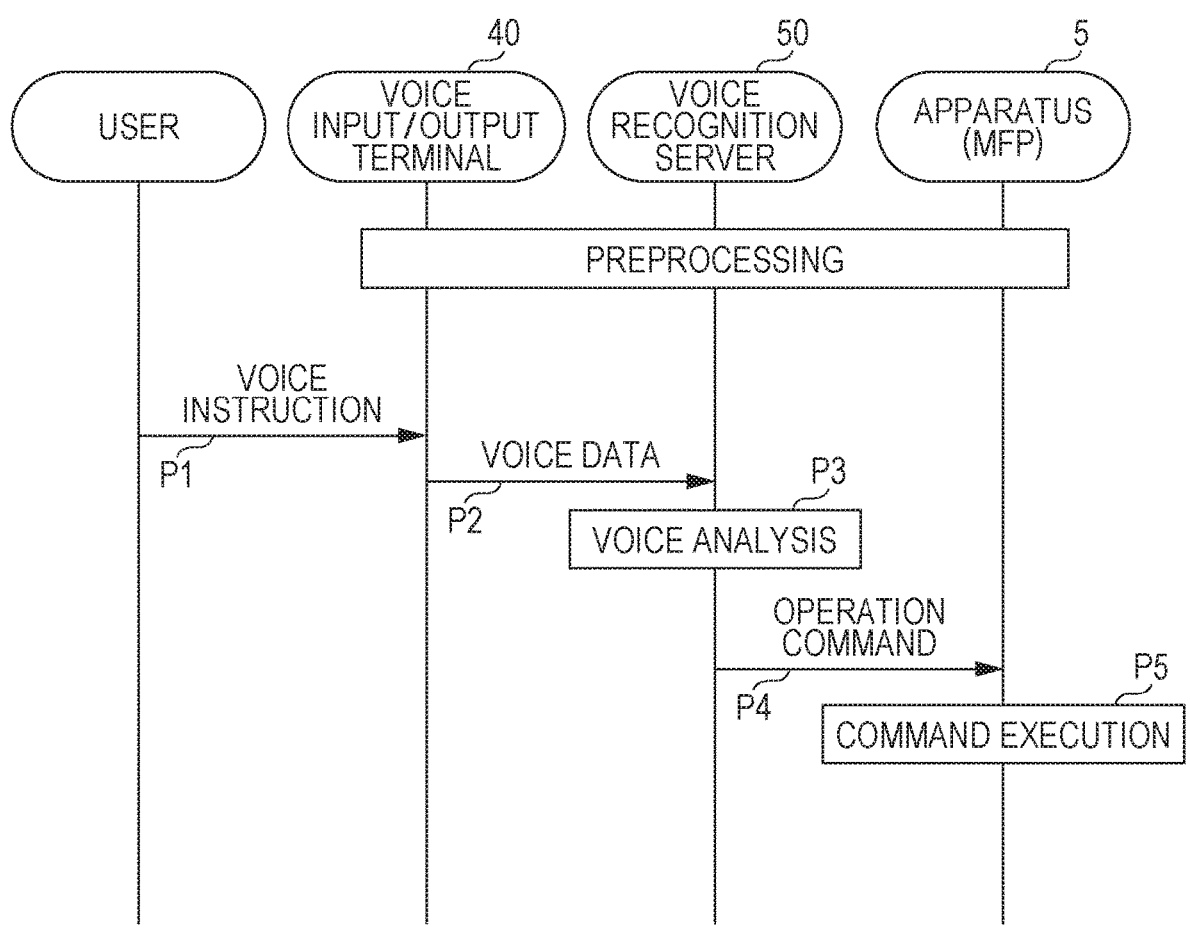
FIG. 9 is a sequence chart showing a data flow when an apparatus receives a voice operation in the system according to the second embodiment of the present invention.

FIG. 9 is a sequence chart showing a data flow when receiving a voice operation in the system according to a second embodiment. The user sounds out the content of the operation to the voice input/output terminal 40 (P1). The voice input/output terminal 40 detects the voice with the microphone, converts the voice into voice data, and transmits the voice data to the voice recognition server 50 (P2).

The voice recognition server 50 analyzes the received voice data to recognize the content of the voice operation, and generates an operation command corresponding to the voice operation (P3). Then, the voice recognition server 50 transmits the generated operation command to the apparatus 5 (P4). The apparatus 5 performs settings related to job input and the like in accordance with the received operation command, and executes the job upon receiving a job start operation command (P5).

As described above, when the voice recognition server 50 on the cloud performs the voice analysis/recognition processing, compared with the case where the apparatus 5 performs the voice analysis/recognition, an extra communication time or the like is required. For this reason, a longer time is required for a setting content manager 33 of the apparatus 5 to obtain the recognized content of the voice operation. Hence, in a case where the voice recognition server 50 on the cloud performs the voice analysis/recognition processing, the reset timer value set in a setting reset timer 36 during acceptance of a setting by voice operation is set to be longer than a case where the apparatus 5 itself performs the voice analysis/recognition processing. For example, the reset timer value is set to be longer than a case where the apparatus 5 itself performs voice analysis/recognition by (T2−T1), which is the difference between a time T1 required for the setting content manager 33 to obtain an operation command corresponding to the content of a voice operation when the apparatus 5 performs voice analysis/recognition and a time T2 required for the setting content manager 33 to obtain an operation command corresponding to the content of a voice operation when the voice recognition server 50 on the cloud performs voice analysis/recognition.

For example, if the reset timer value set in the setting reset timer 36 during acceptance of a setting by voice operation is a set value D when the apparatus 5 itself performs voice analysis/recognition, the reset timer value (reset timer value set in setting reset timer 36 during acceptance of setting by voice operation) set when the voice recognition server 50 on the cloud performs voice analysis/recognition is $$D+(T2-T1).$$

Figure 10:
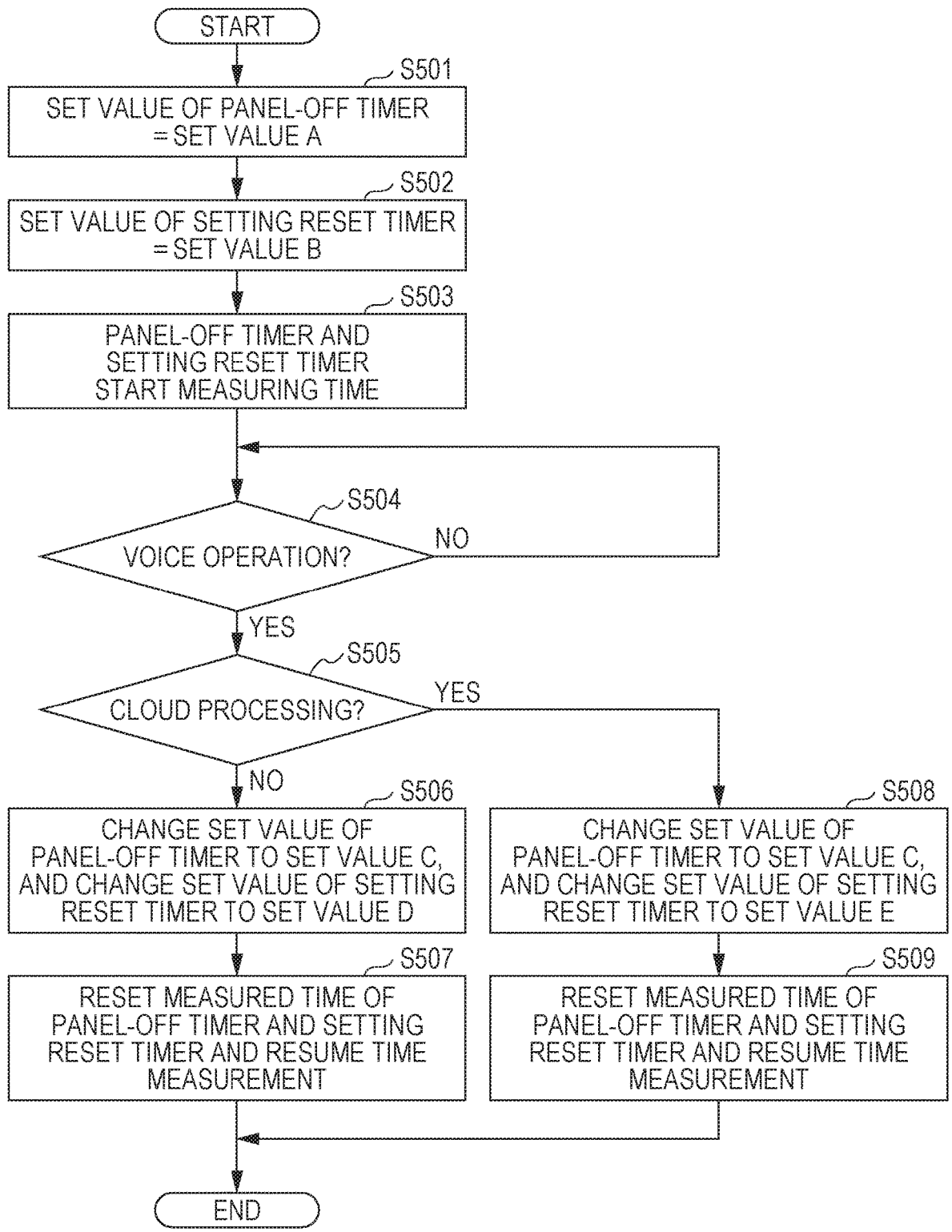
FIG. 10 is a flowchart showing reset timer value change processing performed by a timer value changer according to the second embodiment.

FIG. 10 is a flowchart showing reset timer value change processing performed by the timer value changer 38 when the voice analysis/recognition related to voice operation can be performed by either the apparatus 5 or the voice recognition server 50 on the cloud. First, the off-timer value is set to a default set value A (step S501), and the reset timer value is set to a default set value B (step S502). The set value A and the set value B are in a magnitude relationship of set value A>set value B. After setting the set values, the panel-off timer 35 and the setting reset timer 36 start measuring time (step S503).

Thereafter, it is monitored whether or not a voice operation is received (step S504; No). If a voice operation is received (step S504; Yes), it is determined whether to perform voice analysis/recognition by the voice recognition server 50 on the cloud or by the apparatus 5 itself. If the operation is performed by the apparatus 5 itself (step S505; No), the off-timer value set in the panel-off timer 35 is changed to a set value C, and the reset timer value set in the setting reset timer 36 is changed to the set value D (step S506). The set value D and the set value C are in a magnitude relationship of set value D>set value C. Additionally, there is a relationship of set value D>set value B. Note that the off-timer value may be set value A=set value C or set value C<set value A. After the change in the timer values, the panel-off timer 35 and the setting reset timer 36 resume time measurement (step S507).

On the other hand, if the voice analysis/recognition is performed by the voice recognition server 50 on the cloud (step S505; Yes), the off-timer value set in the panel-off timer 35 is changed to the set value C, and the reset timer value set in the setting reset timer 36 is changed to a set value E (step S508). There is a magnitude relationship of set value E>set value D. As described above, the set value E is D+(T2−T1) or more, for example. After the change in the timer values, the panel-off timer 35 and the setting reset timer 36 resume time measurement (step S509).

Figure 11:
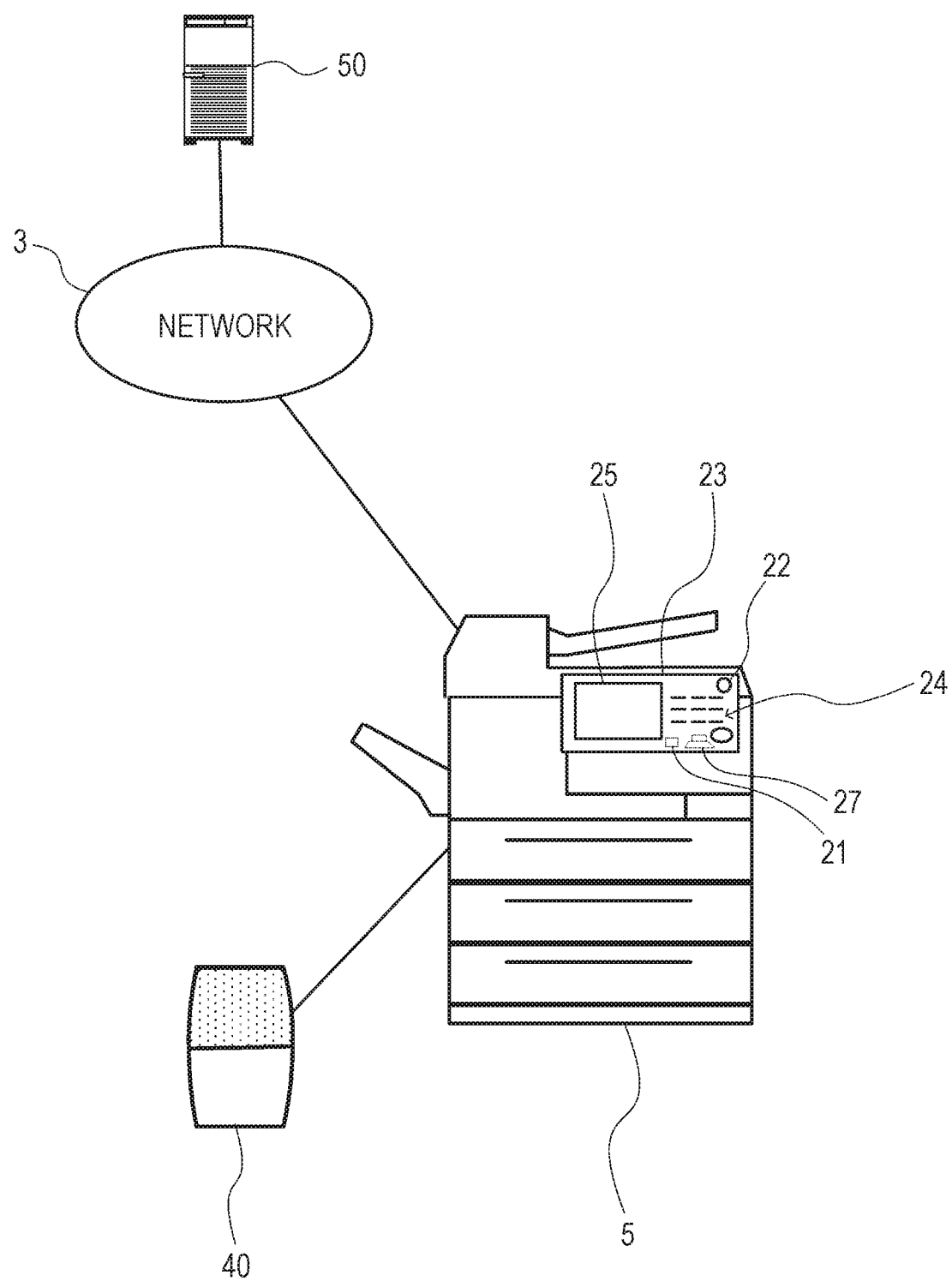
FIG. 11 is a diagram showing a configuration example of a system in which a voice input/output terminal is connected to a voice recognition server through an apparatus.

As shown in FIG. 11, the voice input/output terminal 40 may be connected to the apparatus 5 directly by wire or wirelessly, or through a LAN, and then be connected to the voice recognition server 50 on the cloud through the apparatus 5. Additionally, even in a configuration in which the apparatus 5 itself includes a voice input unit 21 as in the first embodiment, recognition of operation contents by voice may be performed by the voice recognition server 50 on the cloud. In both cases, the sequence shown in FIG. 9 and the processing shown in FIG. 10 are applied in the same manner as in the case of the configuration shown in FIG. 8. Note, however, that the processing P2 in FIG. 9 is performed through the apparatus 5.

Note that the turning off of the power (or transition to power saving mode) of a module unnecessary for voice operation by the off timer can be applied in the same manner as the operation panel 23. For example, when a third timer 37 is used to shift a scanner 16 or a printer 18 to a power saving mode, the relationship between the timer value set in the third timer 37 and the reset timer value set in the setting reset timer 36 may be set in a similar manner as the relationship between the off-timer value of the panel-off timer 35 and the reset timer value.

For example, during acceptance of a setting by voice operation, the reset timer value set in the setting reset timer 36 is set to be longer than the default value, and the timer value set in the third timer 37 is maintained at the default value without being changed. Alternatively, the timer value is set to be shorter than the timer value when a setting is not being accepted by voice operation. The timeout period of the setting reset timer 36 during voice operation can be elongated without impairing the power saving effect on modules not related to voice operation.

The embodiments of the present invention have been described with reference to the drawings. However, the specific configuration is not limited to those shown in the embodiments, and changes and additions within the scope of the present invention are also included in the present invention.

The apparatus according to the present invention is not limited to the MFP described in the embodiments, and may be any apparatus that adopts input operation from an operation panel and voice operation as the method of inputting an instruction from a user.

Although embodiments of the present invention have been described and illustrated in detail, the disclosed embodiments are made for purposes of illustration and example only and not limitation. The scope of the present invention should be interpreted by terms of the appended claims.

What is claimed is:

1. An apparatus comprising:
an operation panel that is configured to display an operation screen and accept an operation from a user;
a storage; and
a hardware processor that is configured to:
   accept an operation from a user input by voice,
   turn off the operation panel in a case in which an interval between operations received by the operation panel exceeds a first set time, and
   reset a setting content stored in the storage in a case in which an interval between operations received by the operation panel or by voice input exceeds a second set time;
wherein the storage is configured to store the setting content corresponding to an operation received by the operation panel or received by the hardware processor by voice input; and
wherein the hardware processor is configured to set the second set time to be longer than the first set time during acceptance of a setting by voice operation, and set the second set time to a same or shorter time than the first set time during acceptance of a setting by operation on the operation panel.

2. The apparatus according to claim 1, wherein the hardware processor is configured to set the second set time to be longer during acceptance of a setting by voice operation than during acceptance of a setting by operation on the operation panel.

3. The apparatus according to claim 1, wherein the hardware processor is configured to set the first set time to be shorter during acceptance of a setting by voice operation than during acceptance of a setting by operation on the operation panel.

4. The apparatus according to claim 1, further comprising a notifier that notifies that a setting is being accepted by voice operation, during acceptance of a setting by voice operation and after the operation panel is turned off.

5. The apparatus according to claim 1, wherein
the hardware processor is configured to set the second set time during acceptance of a setting by voice operation to be longer in a case where a cloud server performs voice analysis/recognition processing related to voice operation than in a case where the apparatus itself performs the voice analysis/recognition processing.

6. The apparatus according to claim 1, wherein the hardware processor is configured to shift a predetermined module to a power saving mode after an elapsed time from an end of a last operation of the predetermined module exceeds a third set time, and the hardware processor does not change the third set time depending on whether or not a setting is being accepted by voice operation.

7. The apparatus according to claim 1, wherein the apparatus is an image forming apparatus that forms an image on a recording medium.

* * * * *